United States Patent [19]
Drillon et al.

[11] Patent Number: 5,946,365
[45] Date of Patent: Aug. 31, 1999

[54] PROCESS FOR PRODUCING A GUIDE TUBE OF A NUCLEAR REACTOR FUEL ASSEMBLY

[75] Inventors: Jean Drillon, Coueron; Jean-Luc Aubin, Saint Brevin les Pins, both of France

[73] Assignee: Zircotube, Courbevoie, France

[21] Appl. No.: 09/003,459

[22] Filed: Jan. 6, 1998

[30] Foreign Application Priority Data

Feb. 12, 1997 [FR] France .................................. 97 01621

[51] Int. Cl.⁶ .................................................. G21C 21/00
[52] U.S. Cl. ......................................... 376/260; 72/370.03
[58] Field of Search .................................. 376/234, 260, 376/353, 449; 72/208, 370.01, 370.02, 370.03, 370.04, 366.2

[56] References Cited

U.S. PATENT DOCUMENTS 5,606,583  2/1997  Verdier .................................... 376/260

FOREIGN PATENT DOCUMENTS

| | | |
|---|---|---|
| 0 144 480 A1 | 6/1985 | European Pat. Off. . |
| 0 661 719 A1 | 7/1995 | European Pat. Off. . |
| 2 510 002 | 1/1983 | France . |
| 880 524 | 11/1981 | U.S.S.R. . |
| 1321495 A1 | 7/1987 | U.S.S.R. . |
| 1360831 A1 | 12/1987 | U.S.S.R. . |
| 1477489 A1 | 5/1989 | U.S.S.R. . |
| 1613209 A1 | 12/1990 | U.S.S.R. . |

*Primary Examiner*—Daniel D. Wasil
*Attorney, Agent, or Firm*—Pollock, Vande Sande & Amernick

[57] ABSTRACT

A tubular blank (22) is rolled on a mandrel (14) in a pilgrim rolling mill. In a first rolling stage, a first part of the blank (22) is rolled on a first part (18,19) of the mandrel (14), with a reduction of the outside diameter of the blank (22) to the outside diameter of the guide tube and a reduction of the wall thickness of the blank (22) to one of a first wall thickness (e1) and a second wall thickness (e2) exceeding the first wall thickness (e1). The mandrel (14) is advanced in the axial direction. A second part of the blank (22) is rolled on a second part (20,21) of the mandrel spaced from the first part in the axial direction with a reduction of the outside diameter of the blank to the outside diameter of the guide tube and a reduction of the wall thickness of the blank (22) to the other of the first wall thickness (e1) and second wall thickness (e2).

6 Claims, 4 Drawing Sheets

PROCESS FOR PRODUCING A GUIDE TUBE OF A NUCLEAR REACTOR FUEL ASSEMBLY

The invention relates to a process for producing a guide tube of a nuclear reactor fuel assembly, a mandrel for forming the guide tube, and the guide tube obtained.

Fuel assemblies, and in particular fuel assemblies for water-cooled nuclear reactors, usually comprise a framework in which are inserted and maintained fuel rods constituting a cluster in which the rods are parallel to one another. The framework in particular comprises guide tubes arranged parallel to the rods of the cluster which constitute both structural elements of the framework and elements for guiding absorber rods and control rods used for regulating in service the reactivity of the core of the nuclear reactor constituted by juxtaposed fuel assemblies. The fuel assemblies are disposed in the core of the nuclear reactor in a vertical position, i.e. in such position that the rods of the cluster of the assembly and the guide tubes are vertical. The guide tubes guiding the absorber rods of the control clusters of the nuclear reactor have, in an end part constituting the lower end part of the guide tubes of the assemblies in the service position in the core, a reduced diameter or a narrowing of the section which has for purpose to create a region in which the absorber rods of the control rods of the reactor are braked or slowed down in the case of a dropping of the control rods subsequent to a stoppage of the nuclear reactor which may be a programmed stoppage or a stoppage for an incidental cause. This device for braking the control rods by a throttling of the cooling fluid of the reactor between the absorber rods of the control bar and the lower part of reduced diameter of the guide tubes operates by a braking effect named a dash-pot effect.

The lower part of the guide tubes of the fuel assemblies is highly stressed upon the dropping of the control rods, in particular by compression of the cooling fluid in contact with the internal walls of the guide tubes of the fuel assembly in their region of reduced diameter. In the case of transitional periods of operation of the nuclear reactor, the assembly may be slightly raised by the cooling fluid and the force of inertia of the fuel assembly when it descends may cause a flexion and/or torsion of the part of reduced diameter of the guide tubes which constitutes a weak part of the tube, when the reduction in the diameter of the lower part of the guide tube is obtained by a necking of the tube, the wall thickness being substantially constant throughout the length of the tube.

It has therefore been proposed to employ guide tubes whose lower end part or base is reinforced in such a manner as to withstand the stresses created by the dropping of the control rods and in the course of the transitional periods. A first solution may comprise reinforcing the lower part of the guide tube by a tubular sleeve which is coaxial with the guide tube, placed against and welded to the guide tube at both ends. However, the welds of the reinforced parts of the guide tubes of zirconium alloy which result in residual stresses, may diminish the mechanical resistance and corrosion resistance of the guide tubes. Further, defects in the alignment may occur between the two tube sections to be assembled.

It was therefore proposed in FR-A-2714516 to produce a guide tube with a reinforced base in one piece. The guide tube has a cylindrical outer surface having of substantially constant diameter, except for end regions for fixing the guide tube to the terminal elements of the fuel assembly, and the wall of the tube has a thickness which is increased in a lower part whose length may be between 10 and 30% of the total length of the tube.

The guide tube is obtained by producing a tubular blank whose thickness is substantially constant and this thickness is reduced in a fraction of its length, between 70 and 90%, while maintaining a constant inside diameter. The part of the blank which had maintained its original thickness is then upset toward the interior so as to constitute a tube having a constant outside diameter. The reduction in the thickness and the upsetting may be effected by rotary hammering operations.

This method of obtaining guide tubes of zirconium alloy has been found to be delicate to carry out.

Further, between the part of the tube, termed the main or body part, having a first thickness which was obtained by reduction in the thickness of the blank and the second part of the tube which was upset toward the interior, there is a transition region having an internal surface in the shape of a conical chamfer whose vertex angle has a value of around 10°. The presence of a discontinuity in the internal cylindrical surface of the guide tube may reduce the quality of the guiding of the absorber rods and limit the dropping speed of the control rods. Further, this transition region may be a weakened region of the guide tube.

For producing tubes sheathing the rods of the fuel assemblies of nuclear reactors of zirconium alloy, a tubular blank is formed in the usual manner by rolling in a pilgrim or pilger rolling mill. The rolling permits obtaining the sheathing tube with its final dimensions in the course of a plurality of successive rolling operations.

This process may also be employed for the shaping of guide tubes of zirconium alloy.

However, such a process has never been employed heretofore for producing a guide tube having a cylindrical outside surface of constant diameter, a body or main part of the guide tube having a first thickness and a lower end part of the guide tube having a second thickness exceeding the thickness of the main part.

An object of the invention is to provide a process for producing a guide tube for a nuclear reactor fuel assembly having a substantially constant outside diameter and comprising at least one main part which has a first wall thickness and a reinforced part, in a fraction of the length of the guide tube, which has a second wall thickness exceeding said first wall thickness, comprising rolling a tubular blank on a mandrel in a pilgrim rolling mill.

For this purpose, the process further comprises:
  effecting, in a first stage, a rolling of a first section of the blank on a first part of the mandrel with a reduction of the outside diameter of the blank to the outside diameter of the guide tube and a reduction of the wall thickness of the blank to one of said first wall thickness and second wall thickness,
  displacing the mandrel in the axial direction of the blank, and
  effecting, in a second stage, a rolling of a second section of the blank on a second part of the mandrel spaced from said first part in the axial direction of the mandrel, with a reduction of the outside diameter of the blank to the outside diameter of the guide tube and a reduction of the wall thickness of the blank to the other of said first wall thickness and second wall thickness.

In order to explain the invention, there will now be described, by way of a non-limitative example with reference to the accompanying drawings, the process according to the invention, the forming mandrel employed for carrying out the process and the guide tube obtained.

IN THE DRAWINGS

Figure 1:
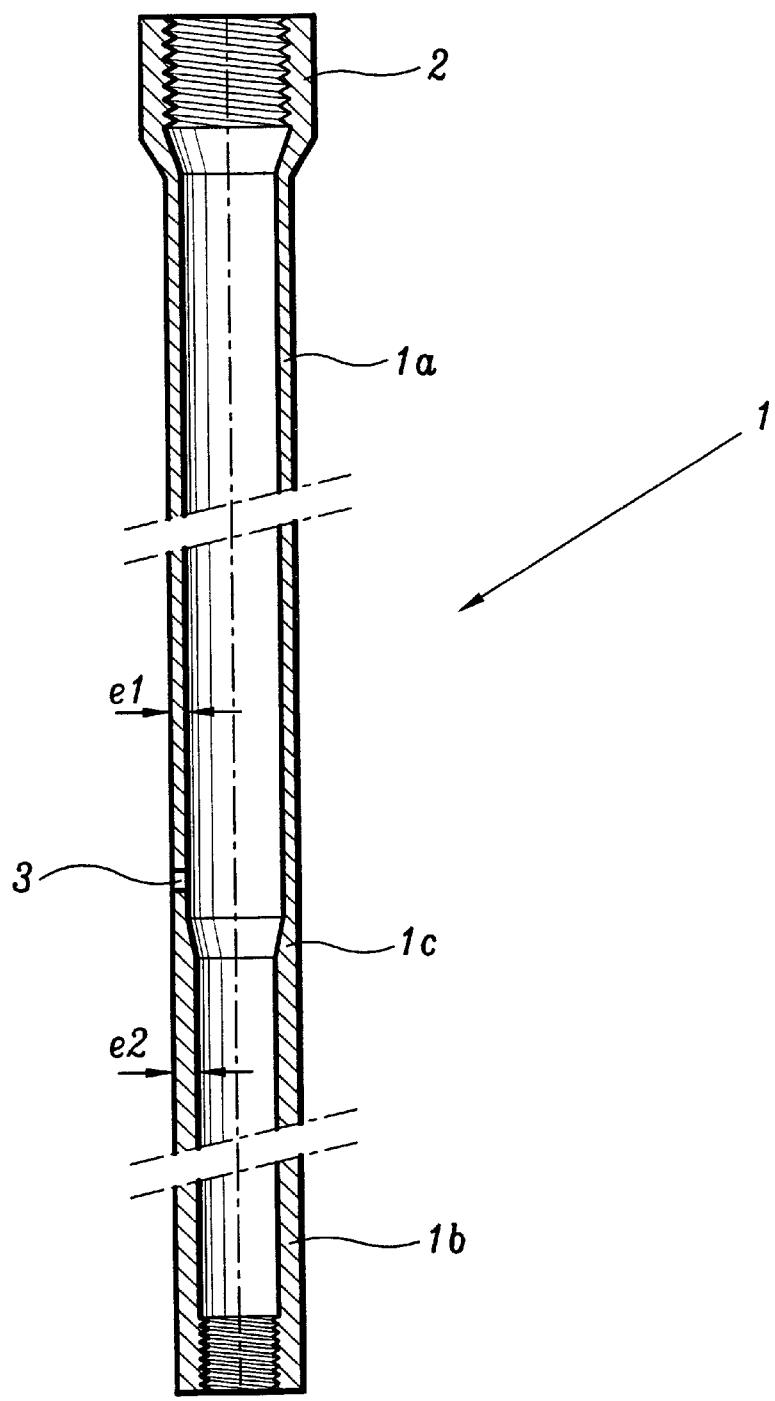
FIG. 1 is an axial sectional view of guide tube having a reinforced base produced in a single piece in accordance with the prior art.

Shown in FIG. 1 is a guide tube of a fuel assembly for a pressurized-water nuclear reactor designated by the general reference numeral 1. The guide tube 1 is of zirconium alloy and has a cylindrical external surface whose diameter is constant along the length of the tube, except for the upper part 2 of the tube which is bell-mouthed and has for example a tapped inner bore. This upper part of the tube permits fixing the tube in the upper terminal element of the fuel assembly, optionally by the use of detachable fixing means. The guide tube 1 further comprises an internally tapped lower end by means of which the tube may be fixed to the lower terminal element of the fuel assembly.

The guide tube 1 comprises a main or body part 1a and a lower end part 1b which differ from each other in that the main part 1a has a first wall thickness e1 and the lower end part 1b a second thickness e2 exceeding the thickness e1. Consequently, the part 1b constitutes a reinforced part of the tube.

In some cases, the guide tube may comprise a reinforced part of increased thickness between two main parts which have a thickness less than the reinforced part, instead of a reinforced end part.

The outside diameter of the tube is constant and identical in the main part of the tube and in the reinforced part 1b.

The inside diameter of the tube in the main part 1a is therefore larger than the inside diameter of the tube in the part 1b and the guide tube 1 has a transition region 1c between its parts 1a and 1b. In the transition region 1c, the internal surface of the tube is formed by a conical or tapered chamfer whose vertex angle is around 10°.

The wall of the lower end part of the tube may have through openings, such as 3, which permit limiting the overpressure of the cooling liquid of the reactor in the lower part of the guide tube upon the dropping of the absorber rod guided by the guide tube rendering more progressive the braking of the absorber rod upon the dropping of a cluster.

The increased thickness e2 of the wall of the guide tube in the lower end part 1b of the guide tube permits reinforcing the lower part of the guide tube and avoiding deterioration of this lower part by the effect of the overpressure upon the dropping of the absorber rod of the control cluster and in the course of the transitional periods of the nuclear reactor. However, the presence of an intermediate region 1c whose internal wall has the shape of a conical or tapered chamfer creates a discontinuity as concerns the guiding of the absorber rod in the guide tube. Further, the intermediate region may be a weak region of the tube.

Further, to produce the tube shown in FIG. 1, there must be employed a forming process, such as a rotary hammering, for reducing the thickness of the wall in the main part of the guide tube, i.e. along the major part of the length of the tube, then for inwardly upsetting the thick wall of the lower part of the tube.

Such a forming process is delicate to carry out and requires a relatively long operating time.

The process according to the invention permits producing a tube which is in a single piece and has a reinforced part, by a rolling technique on a pilgrim or pilger rolling mill.

Figure 2:
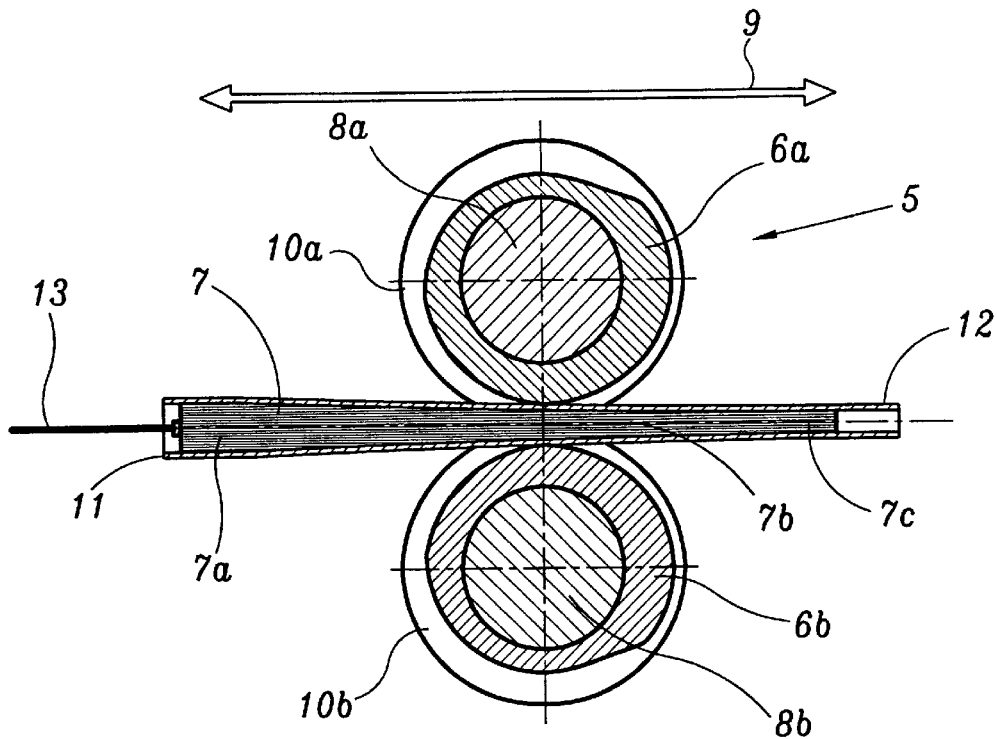
FIG. 2 is an elevational and sectional view of a pilgrim rolling mill in the course of the rolling of a tubular blank.

Shown diagrammatically in FIG. 2 are the main elements of a pilgrim rolling mill for forming a tube from a tubular blank.

The pilgrim rolling mill designated by the general reference numeral 5 mainly comprises a first die 6a and a second die 6b in the form of splined cylinders mounted to be rotatable about their axes, and a mandrel 7 having a symmetrical shape of revolution.

The dies 6a and 6b are rotatively mounted by means of their respective shafts 8a and 8b in a movably mounted cage associated with driving means so as to be capable of travelling in the axial direction of the mandrel 7 in one direction or the other with a constant amplitude, as diagrammatically shown by the double arrow 9.

Each of the dies 6a and 6b comprises a respective peripheral groove 10a or 10b, named spline, which has a cross-sectional shape in the radial direction of the die which is close to a semi-circular shape.

The cross section of the grooves 10a and 10b of the dies 6a and 6b has a dimension which varies continuously along the periphery of the groove, the section having a maximum dimension in an entrance part and a minimum section in the exit part of the groove.

The dies 6a and 6b are driven in rotation about their respective axis in one direction or the other owing to the displacement of the cage in one direction or the other during the reciprocating displacement diagrammatically represented by the double arrow 9.

The pilgrim rolling mill shown in FIG. 2 permits effecting the rolling of the wall of a tubular blank 11 engaged on the mandrel 7 in such manner as to progressively reduce the diameter and the thickness of the wall of the blank and obtain, at the ouput end of the mill, a tube 12 whose diameter and wall thickness are less than the diameter and wall thickness of the blank 11. Owing to the rolling, the blank 11 undergoes an elongation which may be considerable in the axial direction.

The mandrel 7 on which the blank 11 is engaged is connected to a rod 13 which permits moving the mandrel 7 in translation and in rotation about its axis.

The pilgrim rolling mill 5 further comprises a carriage (not shown) which may be fixed to the blank 11 by clamps. The carriage permits advancing the blank in the rolling direction after each of the steps effected by the pilgrim rolling mill. The device for advancing the blank also permits rotating it about its axis at the end of each of the rolling steps.

The mandrel 7 comprises a first cylindrical part 7a whose diameter is less than the inside diameter of the blank 11, a second symmetrical part 7b of revolution whose meridian curves have substantially the shape of parabolas and a slightly conical or tapered end part 7c whose diameter is the final inside diameter of the tube 12 to be produced or close to said final inside diameter.

The dies 6a and 6b are disposed on opposite sides of the mandrel 7 on which the blank 11 and the tube 12 in the course of rolling are engaged, in such manner that the grooves 10a and 10b constitute, during the travel in the axial direction and the rotation of the dies, a tube-forming surface having a roughly circular section. Owing to the fact that the dimension of the cross sections of the grooves 10a and 10b vary in a continuous manner along the periphery of the dies, the dimensions of the cylindrical forming surface of the tube themselves vary between a maximum dimension and a minimum dimension during the displacements of the cage and dies.

The cage travels in the axial direction with an amplitude substantially corresponding to the length of the mandrel, along the region 7b of reduction of the blank and the region 7c of the calibration of the tube 12; the diameter and the thickness of the blank 11 are progressively reduced to the values of the diameter and wall thickness of the tube 12.

At the end of each of the displacements of the rolling cage, the blank is advanced along the mandrel with a certain amplitude in the axial direction, and the blank is made to turn about its axis through a certain angle. Simultaneously, the mandrel 7 is made to turn about its axis by the rod 13.

The rolling can be effected in a substantially continuous manner by engaging blanks one after the other on the rod 13 and the mandrel 7 and collecting the tubes 12 at the output end of the rolling mill.

The pilgrim rolling method just described can be applied to the production of guide tubes comprising a lower end part having a wall of increased thickness relative to the wall thickness of the main part of the tube.

Figure 3:
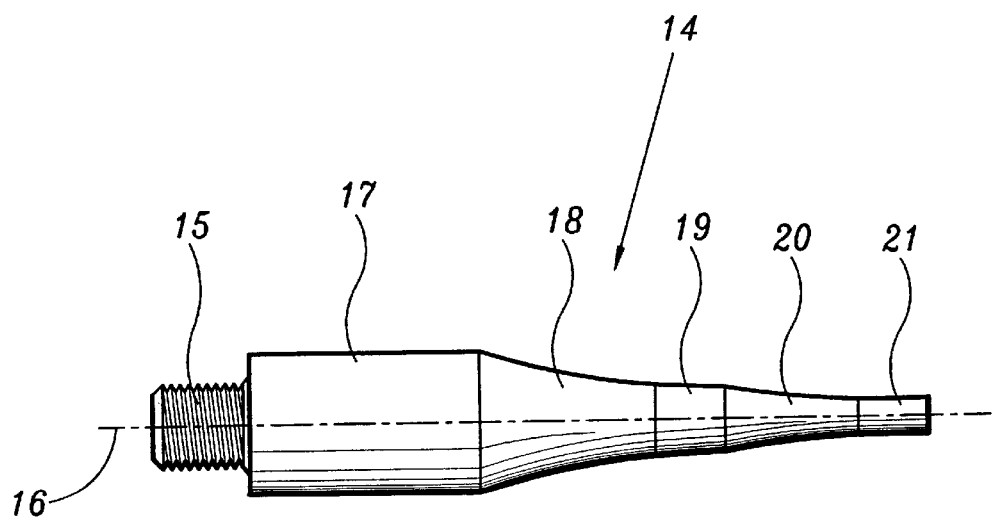
FIG. 3 is a side elevational view of the forming mandrel employed in the process for producing a guide tube according to the invention.

To carry out the process for producing guide tubes according to the invention, there is employed a pilgrim or pilger rolling mill comprising a mandrel of a special shape, such as that shown in FIG. 3.

The mandrel 14 having a symmetrical shape of revolution comprises a screw-threaded end 15 for connecting the mandrel to a holding and actuating rod. Following on the threaded part in the axial direction 16, the mandrel comprises a first cylindrical part 17 whose diameter is less than the inside diameter of the starting blank used for forming the guide tube, a first part 18 having a symmetrical decreasing section of revolution and a meridian in the shape of a parabola or a shape which approaches a parabola, and a third slightly conical or tapered part 21 whose diameter is equal to roughly the inside diameter of the reinforced lower end part of the guide tube to be produced.

The mandrel 14 therefore comprises a plurality of successive forming sections in the axial direction constituting different guide tube-forming stages.

Figure 4A:
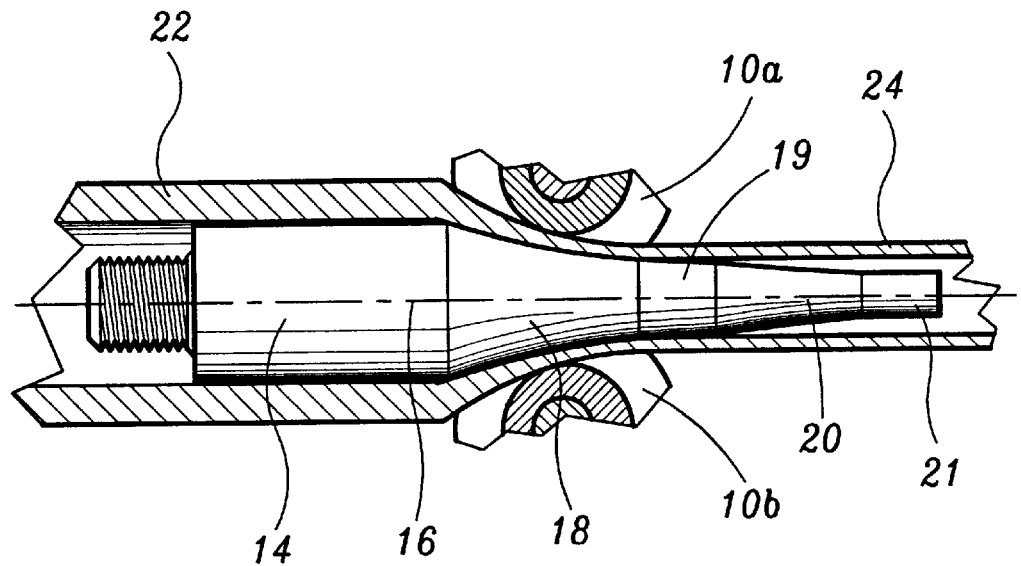
FIGS. 4A and 4B are side elevational views, partly in section, of a mandrel and a blank in the course of the forming of the latter in two stages of a process for producing guide tubes according to the invention.
Figure 4B:
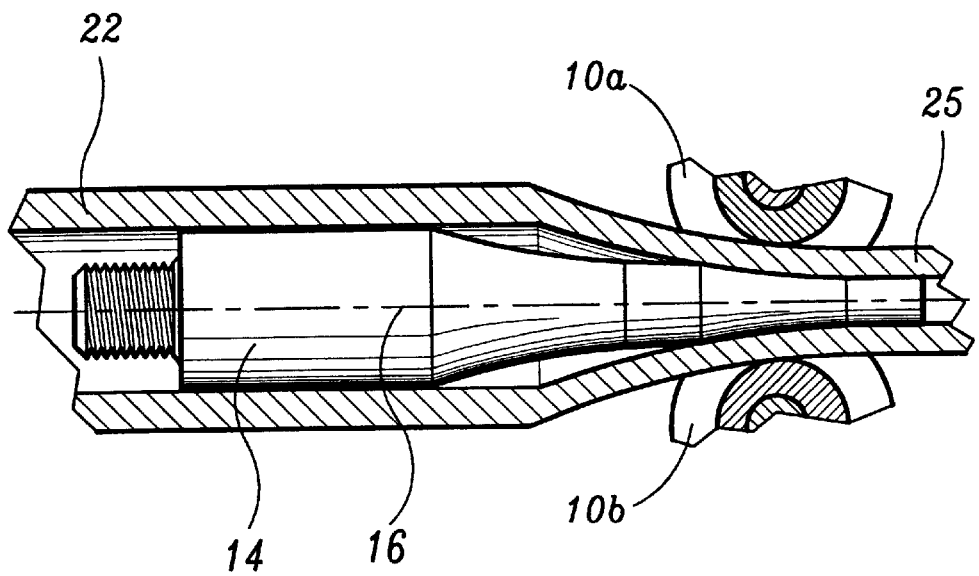

The stepped forming mandrel 14 is used for producing guide tubes according to the invention in the course of two successive stages respectively represented in FIGS. 4A and 4B effected in this order or in the opposite order which may possibly be carried out on successive sections of a tube blank so as to produce in a single operation a rolled product from which it is possible to obtain, by cutting off, a plurality of guide tubes having a reinforced part.

FIG. 4A shows the mandrel 14 in the course of a first pilgrim rolling stage of a tubular blank 22 of which both the diameter and the wall thickness exceed the diameter and the wall thickness of the guide tube to be produced.

The pilgrim rolling mill comprises two dies 10a and 10b which are similar to the dies described in the case of the pilgrim rolling mill 5 shown in FIG. 2.

The pilgrim rolling mill used for carrying out the process of the invention and shown in FIGS. 4A and 4B differs from the pilgrim rolling mill of the conventional type shown in FIG. 2 only in respect of the use of the stepped mandrel 14 and the mechanization of the axial displacement of the mandrel.

The dies 10a and 10b freely rotatively mounted in a cage which may be displaced in the axial direction 16 of the mandrel 14, permit reducing the diameter and the thickness of the blank 22.

The blank 22 was obtained by prior production and shaping operations which may themselves include pilgrim rolling operations.

The blank 22 has an inside diameter slightly larger than the outside diameter of the cylindrical part 17 of the mandrel 14 and a wall thickness exceeding the wall thickness of the guide tube in its lower end part where the wall thickness is maximum.

As can be seen in FIG. 4A, the pilgrim rolling is effected during the first rolling stage with the mandrel 14 placed in such manner that the dies 10a and 10b rotatively mounted in the cage of the rolling mill are displaced in a reciprocating manner along the parts 18 and 19 of the mandrel 14.

In this way, the inside diameter and the outside diameter of the tubular product 24 obtained at the output end of the rolling mill, i.e. on the downstream side of the region 19 of the mandrel 14, are identical to the inside diameter and the outside diameter of the main part of the guide tube to be produced. In particular, the part 19 of the mandrel 14 constitutes a part for calibrating the product 24 so that its inside diameter has for precise dimension the required inside diameter for producing the guide tube.

The dimension and the arrangement of the dies 10a and 10b are such that the outside diameter of the product 24 at the output end of the rolling mill precisely corresponds to the required outside diameter for producing the guide tube.

The first rolling stage is carried out by effecting a certain number of successive rolling steps between which the blank 22 is advanced and rotated about its axis, the mandrel 14 being also rotated through a certain angle between the successive rolling steps.

A coding device associated with the pilgrim rolling mill permits determining in a very precise manner the length of the product 24 obtained at the output end of the rolling mill. When a predetermined length of the product has been obtained at the output end of the rolling mill, the coding device delivers a signal for displacing the mandrel 14 in the axial direction and possibly stopping the rolling mill.

The second rolling stage, shown in FIG. 4B, is indeed effected after a displacement of the mandrel 14 in the axial direction toward the upstream end of the pilgrim rolling mill so as to place the parts 20 and 21 of the mandrel in the working region of the rolling mill, i.e. in the region of the displacement of the dies 10a and 10b.

The displacement of the mandrel 14 from its position shown in FIG. 4A for carrying out the first rolling stage to its position shown in FIG. 4B for carrying out the second rolling stage, can be achieved after having stopped the pilgrim rolling operation, the cage in which the dies 10a and 10b are mounted being stationary, or without stopping the rolling, in which case the cage in which the dies are mounted remains in motion.

In the second stage of the rolling, the rotative dies 10a and 10b displaced in the axial direction by the cage of the rolling mill, reduce the dimensions of the blank in such manner as to obtain at the output end of the rolling mill, i.e. on the downstream side of the part 21 of the mandrel, a rolled tubular product 25 whose inside diameter calibrated by the part 21 of the mandrel is equal to the required inside diameter for producing the guide tube, in its reinforced lower end region.

The outside diameter of the product 25 is identical to the outside diameter of the product 24 obtained in the first rolling stage owing to the fact that the dies 10a and 10b employed are the same as those used in the first stage of the rolling.

The mandrel 14 must comprise, generally, a first part whose cross-sectional diameter diminishes in the axial direction from a value less than the inside diameter of the blank to a value equal to the inside diameter of the main part of the tube to be produced, and a second part whose cross-sectional diameter diminishes, in the axial direction of the mandrel, from a value equal to the inside diameter of the main part of the tube to be produced to a value equal to the inside diameter of the lower end part of the tube to be produced.

The wall thickness of the product 25 at the output end of the rolling mill therefore very precisely corresponds to the wall thickness to be obtained in the lower end part of the guide tube. The coding device permits, as before, stopping the second rolling stage as soon as a predetermined length of the product 25 has been obtained at the output end of the rolling mill. The mandrel is then displaced from its second position to its first position.

The first rolling stage, the first displacement of the mandrel, the second rolling stage and the second displacement of the mandrel may be affected repeatedly as many times as necessary for completely rolling a blank 22. Also, it is obviously possible to invert the first and second rolling stages.

In this way there is obtained at the output end of the pilgrim rolling mill a rolled tubular product comprising successive sections 24 whose inside diameter and wall thickness correspond to the inside diameter and wall thickness of the main part of a guide tube 25 to be produced, and whose inside diameter and wall thickness correspond to the diameter and wall thickness of the lower end parts of the guide tubes to be produced.

Figure 5:
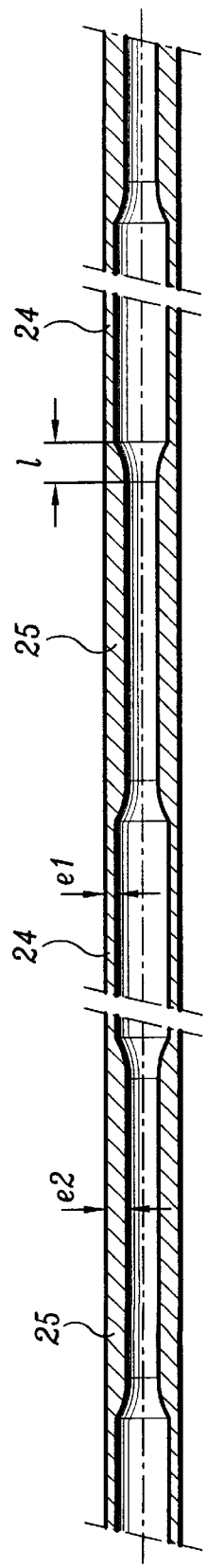
FIG. 5 is an axial sectional view of a product obtained at the output end of the pilgrim rolling mill during the production of a guide tube according to the invention.

Such a product obtained at the output end of the rolling mill is shown in FIG. 5 in which the wall thickness differences have been greatly exaggerated.

In the case of the production of guide tubes for fuel assemblies of a pressurized water nuclear reactor, the main or body part 24 of the guide tubes has a thickness e1 which may be 0.5 mm. The reinforced lower end parts of the guide tubes have a thickness e2 of the order of 1.2 mm.

The production process according to the invention on a pilgrim rolling mill permits obtaining a transition region between the main parts and the reinforced parts of the guide tubes of a length l of the order of 180 mm. In all cases, this length of the transition region exceeds 100 mm. As the guide tube itself has a diameter of the order of 12.5 mm, the result is that the change in the inside diameter of the guide tube between the main part and the reinforced part is very progressive. The transition region between the parts of different diameters of the internal surface of the tube is different from a chamfer, which constitutes the difference between the guide tubes according to the invention and guide tubes of the prior art.

Further, the continuous tube-forming process permits obtaining transition regions in which the metal is faultless and which therefore do not constitute weak regions of the tube.

Figure 6:
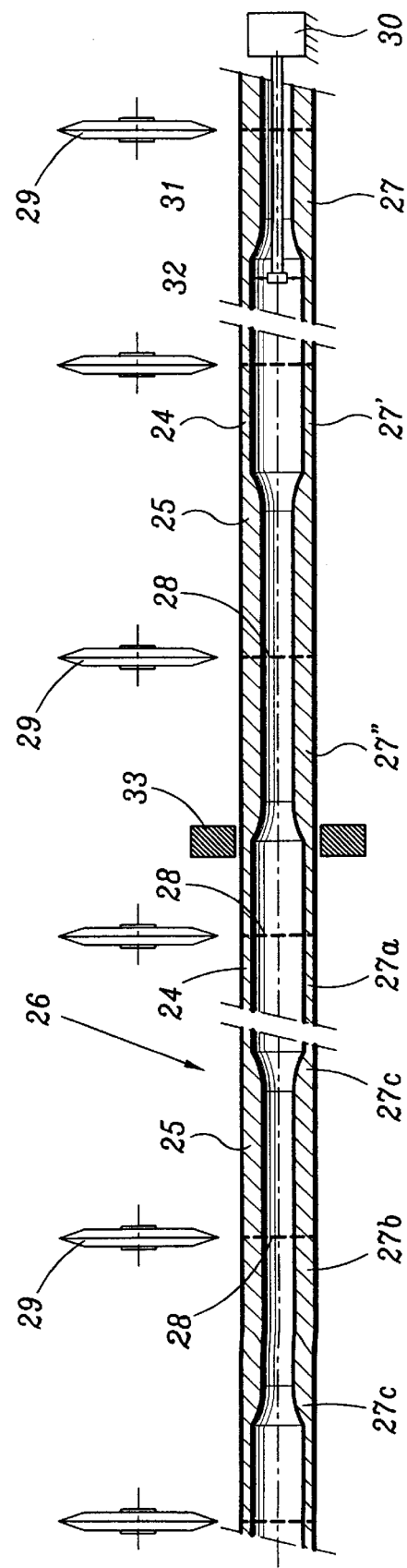
FIG. 6 is an axial sectional view of the rolled product obtained at the output end of the pilgrim rolling mill, in the course of a cutting operation for obtaining guide tubes.

As seen in FIG. 6, the tubular product 26 obtained at the output end of the rolling mill and comprising successive regions 24 and 25 of different wall thicknesses has a constant outside diameter.

Further, the length of the regions 24 and 25 was chosen when rolling, in such manner as to provide, by a cutting or sectioning of the tube 26 in given regions, a plurality of guide tubes 27 each comprising a main or body part 27a and a reinforced lower end part 27b having the required length and wall thickness. Preferably, the regions 24 and 25 have a length which is roughly equal respectively to double the length of the main part and double the length of the reinforced part of the guide tube to be produced.

The location of the position of the cutting lines 28 along which a tool 29 must effect in succession the cutting of the rolled tubular product 26, is obtained by the use of a device for precisely locating the transition regions 27c between the parts of the tubular product 26 of different thicknesses. The end of the regions 25 of the tubular product 26 connected to the transition regions 27c, of length 180 mm, along which the wall changes from the first thickness e1 to the second thickness e2 is very precisely located. The precise location of the end of the regions 25 and 27c may be obtained with the use of an air gauge 30 comprising a pipe 31 which is axially engaged inside the tubular product 26 and includes a nozzle 32 at its end. The flow characteristics of the air through the nozzle 32 which can be ascertained by the air gauge 30 permit very precisely determining the end of the regions 25 of thickness e2 and the transition regions 27c between the parts of the tubular product having different thicknesses.

The cutting tool 29, formed by a cutting disc, is placed at a definite distance from the position which had been located for effecting the cutting of the tube along the line 28.

The cutting tool 29 may be a tool of a flying cutting device which is displaced in synchronism with the tubular product 26 at the output end of the rolling mill.

It is also possible to determine the position of the end of the regions 25 and of the transition regions 27 with the use of a coil 33 surrounding the tube and constituting an eddy current sensor.

By locating the ends of the successive regions 25 and transition regions 27c of the rolled tubular product 26, it is possible to cut off guide tubes 27, 27', 27" formed by successive sections of the tubular product 26.

It is possible to envisage blanks and pilgrim rolling operations which permit obtaining four to five guide tubes having a length of the order of 4 m, from each of the blanks 22 rolled in the pilgrim rolling mill.

It is also possible to employ a flying or mobile cutting device which is actuated by the advance or the retraction of the mandrel between the different rolling stages, with a certain time delay, or by devices for locating the ends of the transition regions such as those described hereinbefore, for cutting the rolled product in the form of the guide tube at the output end of the rolling mill and during the rolling operation. By achieving a precise location of the transition regions and effecting the cutting of the guide tubes by a flying cutting device at the output end of the rolling mill, it is possible to avoid undesired variations in the length of the successive regions of different wall thicknesses 24 and 25 of the rolled product and obtain guide tubes by a simple cutting.

In the usual manner, the length of the lower end region of the tube whose wall thickness exceeds the wall thickness of the main part of the tube, represents 10 to 30% of the total length of the guide tube.

The invention therefore permits obtaining guide tubes in one piece, reinforced for example in their lower part, by means of a rolling process which may easily be rendered automatic and results in a very high productivity.

It must be understood that the scope of the invention is not intended to be limited to the described embodiment.

Thus the mandrel on which the pilgrim rolling is carried out may have a form different from that described.

The process may be used for producing guide tubes composed of a material different from a zirconium alloy.

Generally, the invention is applicable to the production of guide tubes of fuel assemblies of any type in which the motion of the control rods is slowed down by a dash-pot effect.

What is claimed is:

1. Process for producing a guide tube for a nuclear reactor fuel assembly, said guide tube having a substantially constant outside diameter and comprising at least one main part having a first wall thickness and, on a fraction of the length of said guide tube, a reinforced part which has a second wall thickness exceeding said first wall thickness, by rolling a tubular blank on a mandrel in a pilgrim rolling mill, said process comprising the steps of:
effecting, in a first stage, a rolling of a first section of said blank on a first part of said mandrel with a reduction of the outside diameter of said blank to said outside diameter of said guide tube and a reduction of the wall thickness of said blank to one of said first and second wall thicknesses,
displacing said mandrel in the axial direction of said blank, and
effecting, in a second stage, a rolling of a second section of said blank on a second part of said mandrel spaced from said first part in the axial direction of said mandrel, with a reduction of said outside diameter of said blank to said outside diameter of said guide tube and a reduction of said wall thickness of said blank to the other of said first and second wall thicknesses.

2. Process according to claim 1, comprising effecting in succession along the length of the same blank in a repeated manner, said first rolling stage, a first intermediate displacement of said mandrel, said second rolling stage and a second displacement of said mandrel in the opposite direction to said first displacement, said first intermediate displacement of said mandrel being effected in the axial direction between a first position and a second position permitting said reductions in diameter and wall thickness of said blank in the course of said first stage and said second stage respectively, receiving at the output end of said pilgrim rolling mill a rolled tubular product comprising successive regions having respectively said first wall thickness and said second wall thickness, cutting said rolled tubular product into sections in given regions thereof for obtaining a plurality of guide tubes each of which comprises a main part having a first wall thickness and a reinforced part having a second wall thickness exceeding said first wall thickness.

3. Process according to claim 2, wherein said tube is cut with the use of a flying cutting device.

4. Process according to claim 2, comprising, prior to said cutting of said rolled product, locating on said rolled product the position of one end of transition regions between the parts of said rolled tubular product having said first wall thickness and second wall thickness respectively.

5. Process according to claim 4, comprising locating said end of said transition regions with the use of an air gauge connected by a pipe to a nozzle which is inserted inside said tubular product.

6. Process according to claim 4, comprising locating said position of said end of said transitions of said rolled tubular product with the use of an eddy current sensor formed by a coil surrounding said rolled tubular product.

* * * * *